No. 694,868. Patented Mar. 4, 1902.
H. W. LARSSON.
MACHINE FOR TRIMMING STRIPS OF RATAN.
(Application filed June 26, 1901.)
(No Model.) 10 Sheets—Sheet 1.

Witnesses
Chas. F. Schwef
M. A. Campbell

Inventor
Henry W. Larsson,
By his Attorney
W. F. Bellow

No. 694,868. Patented Mar. 4, 1902.
H. W. LARSSON.
MACHINE FOR TRIMMING STRIPS OF RATAN.
(Application filed June 26, 1901.)
(No Model.) 10 Sheets—Sheet 2.

No. 694,868. Patented Mar. 4, 1902.
H. W. LARSSON.
MACHINE FOR TRIMMING STRIPS OF RATAN.
(Application filed June 26, 1901.)
(No Model.) 10 Sheets—Sheet 5.

Witnesses
Chas. F. Schnell
M. A. Campbell

Inventor
Henry W. Larsson
By his Attorney

THE NORRIS PETERS CO., PHOTO-LITHO., WASHINGTON, D. C.

No. 694,868. Patented Mar. 4, 1902.
H. W. LARSSON.
MACHINE FOR TRIMMING STRIPS OF RATAN.
(Application filed June 26, 1901.)
(No Model.) 10 Sheets—Sheet 6.

No. 694,868. Patented Mar. 4, 1902.
H. W. LARSSON.
MACHINE FOR TRIMMING STRIPS OF RATAN.
(Application filed June 26, 1901.)
(No Model.) 10 Sheets—Sheet 7.

No. 694,868. Patented Mar. 4, 1902.
H. W. LARSSON.
MACHINE FOR TRIMMING STRIPS OF RATAN.
(Application filed June 28, 1901.)
(No Model.) 10 Sheets—Sheet 8.

Witnesses
Chas. F. Schmelz
M. A. Campbell

Henry W. Larsson Inventor
By his Attorney
Wm. F. Bellows.

No. 694,868. Patented Mar. 4, 1902.
H. W. LARSSON.
MACHINE FOR TRIMMING STRIPS OF RATAN.
(Application filed June 26, 1901.)
(No Model.) 10 Sheets—Sheet 9.

Witnesses
Chas. F. Schmelz
M. A. Campbell

Inventor
Henry W. Larsson
By his Attorney
Wm. F. Bellows

No. 694,868. Patented Mar. 4, 1902.
H. W. LARSSON.
MACHINE FOR TRIMMING STRIPS OF RATAN.
(Application filed June 26, 1901.)
(No Model.) 10 Sheets—Sheet 10.

Witnesses
Chas. F. Schmelz
M. A. Campbell

Inventor
Henry W. Larsson,
By his Attorney
N. F. Bellows

THE NORRIS PETERS CO., PHOTO-LITHO., WASHINGTON, D. C.

UNITED STATES PATENT OFFICE.

HENRY W. LARSSON, OF SPRINGFIELD, MASSACHUSETTS, ASSIGNOR TO LARSSON WHIP COMPANY, OF SPRINGFIELD, MASSACHUSETTS, A CORPORATION OF MASSACHUSETTS.

MACHINE FOR TRIMMING STRIPS OF RATAN.

SPECIFICATION forming part of Letters Patent No. 694,868, dated March 4, 1902.

Application filed June 26, 1901. Serial No. 66,152. (No model.)

*To all whom it may concern:*

Be it known that I, HENRY W. LARSSON, a citizen of the United States of America, and a resident of Springfield, in the county of Hampden and State of Massachusetts, have invented certain new and useful Improvements in Machines for Trimming Strips of Ratan or Similar Material, of which the following is a full, clear, and exact description.

This invention relates to machines for trimming strips of ratan or similar material, said strips having been formed by dividing a segmental portion of a cylindrical body into a pair of complementary parts of tapering form and a plurality of such strips being adapted to be united to form a conical body, the length of which will correspond to the length of the individual strips of which said body is composed. Conical bodies of ratan formed in the manner above described may be employed for many different purposes, the article to be produced by assembling a plurality of such complementary strips being in the present instance a whip formed of a number of substantially equal segmental strips, each of which is sector-shaped or triangular in cross-section and uniformly tapered substantially for the entire length thereof, so that when these strips are properly assembled the outer surface will be comparatively smooth and substantially conical. At the same time the inclosed angles opposite to the outer surface in each of such strips are alike in all cases, and their apexes are disposed at such distance therefrom as to meet in one common center, while the sides whereby such angles are formed may be fitted closely together to form practically one solid body.

It is well known in the art that the outer surface or skin of ratan is very tough and hard, while, on the other hand, the body portion thereof is comparatively soft and fibrous and may more easily be broken and softened than the outer skin, and hence it is evident that a strip of ratan, only the body portion of which is cut or trimmed, while the outer skin is preserved in its natural condition, will possess a greater amount of durability and strength than one which is trimmed all around. For this reason my improved machine is especially adapted for cutting and trimming the fibrous sides of the strips and without in any way working on or defacing the outer skin thereof, so that when the several strips are assembled to form the whip the natural skin of the ratan will constitute the outer surface thereof.

My invention has primarily for its object the provision of a machine whereby strips of the character above described may be cut or trimmed into a uniform and aliquot form, so that said strips may be readily assembled to form a unitary body; and my invention comprises in combination with suitable feeding means a plurality of cutters consecutively effective upon the plane sides or surfaces of the strip to reduce the cross-section thereof uniformly and to taper the same substantially for its entire length and during the longitudinal movement of said strips through the machine.

A machine built in accordance with my invention is particularly adapted for trimming the radial sides of strips of ratan, which are substantially sector-shaped in cross-section and the outer surface of which is maintained in its natural condition.

My invention has, furthermore, for its object the provision of means whereby the inner body portion of the strip will be truncated and at the same time uniformly tapered from end to end; and my invention therefore comprises a knife or other suitable cutter, the position of which may be progressively varied laterally of the strip and during the advancing longitudinal movement thereof.

My invention has, furthermore, for its object the provision of a plurality of cutters, whereby the plane sides of the strip after it has been truncated cross-sectionally into the desired form may be trimmed alternately until the strip has acquired the proper shape—viz., tapering uniformly substantially from end to end and having one end thereof substantially triangular or sector-shaped, while at its other end the two inclosing sides and the outer skin-surface of the strip merge practically into one point. It should be understood, however, that the radius of the sector as it appears on the large end will correspond with the arc of the inclosed angle, so that when the several strips are assembled they will fit closely against each other, and thus form a unitary body.

It should be understood at the outset that it is immaterial when carrying my invention into practice what the angle inclosed between the fibrous sides of the strip may be, and for the purpose of properly illustrating the invention I have shown in the accompanying drawings a machine which will trim a strip of ratan into such a shape that eight strips may be assembled to form a whip-body, the taper of which may be as required.

In the drawings accompanying this specification, and in which similar characters denote similar parts, Figures 1$^a$ and 1$^b$, in combination, represent a plan of my improved machine. Figs. 2$^a$ and 2$^b$ show a front view thereof. Figs. 5 to 8, inclusive, are details of the preparatory or truncating knife, on an enlarged scale, Fig. 5 being a front view of a pair of such knives. Fig. 6 shows a side view looking from the right of Fig. 5. Fig. 7 is a top view of Fig. 6, and Fig. 8 representing a horizontal section taken on line C D of Fig. 5.

In the accompanying drawings, $a$ $a$ denote a pair of bars suitably supported upon legs or standards $b$, said bars constituting a frame carrying a number of brackets $c$, within which is journaled the main driving-shaft $d$, having at one end thereof a pulley $e$. Held in the several brackets $c$ are a series of cutters whereby the strip of ratan is acted upon during its progress through the machine.

Means are provided whereby strips of ratan may be properly brought into position to be engaged by the feeding means, which bring the strip into engagement with the several cutters. The device for entering the strips comprises substantially a drum $f$, mounted for rotation upon a preferably stationary spindle $g$, which may be supported from the bars $a$ in any suitable manner.

The drum $f$ may be provided at its periphery with a plurality of notches or indentations $h$, into which the strips of ratan may be placed by hand and in which they are retained—as, for instance, by suitable springs $i$.

In coöperation with the drum $f$ is a gage-plate $j$, supported by a bracket $k$, which may be secured to the stationary shaft $g$ in any desired manner, said gage-plate serving as a device against which the ends of the strips may be brought to rest after being placed beneath the springs $i$, so that when the drum $f$ is being turned the strips may be brought consecutively into position to be engaged by the feeding means, whereupon said strips will be withdrawn from under the springs $i$ and carried into engagement with the several cutters whereby the sides of the strips are to be trimmed in the required manner.

Figure 3:
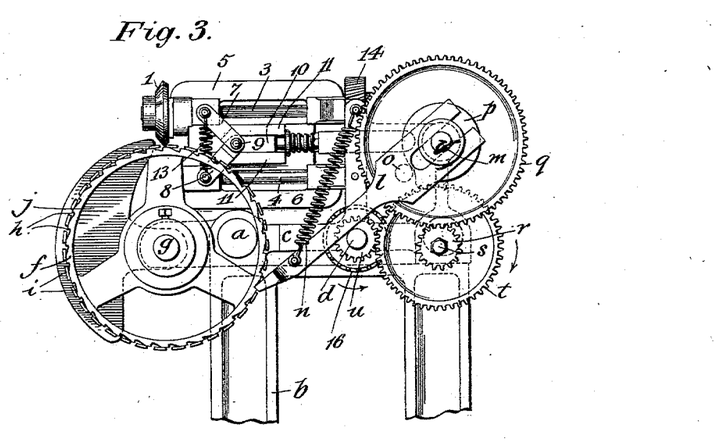
Fig. 3 is an end view of the machine looking from the right of Fig. 2$^b$.
Figure 4:
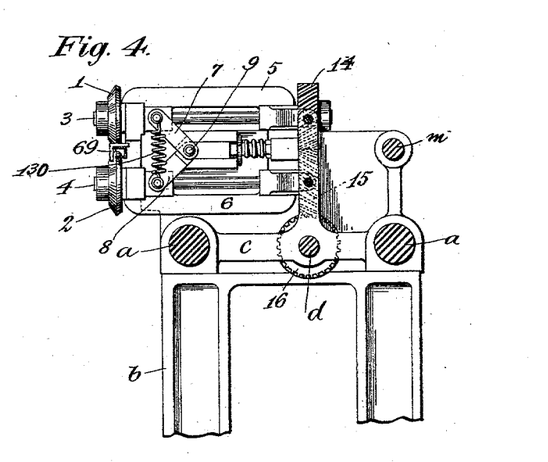
Fig. 4 is a vertical cross-section taken on line A B of Fig. 1$^a$.
Figure 5:
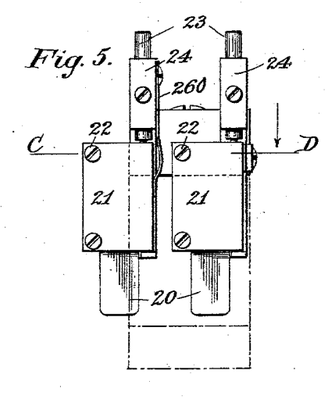
Figures 6, 7:
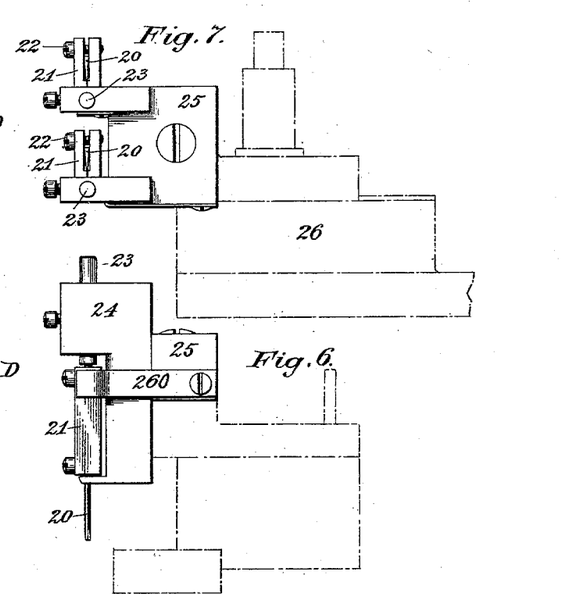
Figure 8:
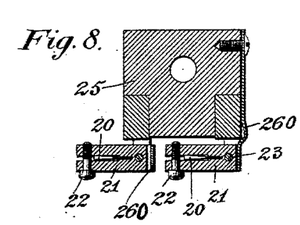

The mechanism for imparting a rotating motion to the drum $f$ is such as to render said rotation an intermittent one, and comprises in the present instance a dog $l$, bifurcated at its rear end, as is clearly shown in Fig. 3, to straddle a shaft $m$, while its lower end may be held in contact with the drum $f$ by a spring $n$, which also serves to retract the dog $l$ and to hold the cam-roller $o$, carried thereon, against a suitable cam $p$, secured to the shaft $m$, above referred to.

A rotary movement may be imparted to the shaft $m$ through a gear $q$, in engagement with a pinion $r$, which is mounted on a stud $s$ and is driven through a gear $t$, in engagement with a pinion $u$ upon the main driving-shaft $d$.

From the above description it will be seen that as the shaft $d$ rotates a reciprocatory movement will be imparted to the dog $l$, and that therefore the drum $f$ will be intermittently rotated for the purpose above mentioned.

Figures 15, 16:
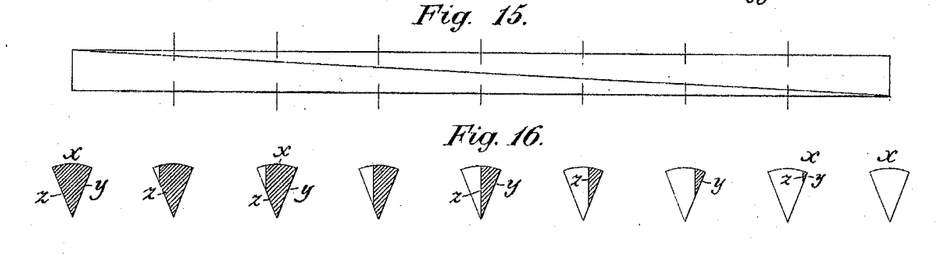
Figs. 15 and 16 illustrate, respectively, a top view and a series of vertical sections of a strip of ratan of originally substantially uniform cross-section and divided into two complementary parts by an oblique cut running from end to end of the strip, both of said complementary parts being designed to be trimmed and converted into a pair of similar tapering strips, the butt-ends of which may subsequently be brought together side by side constitute a conical body.
Figure 17:
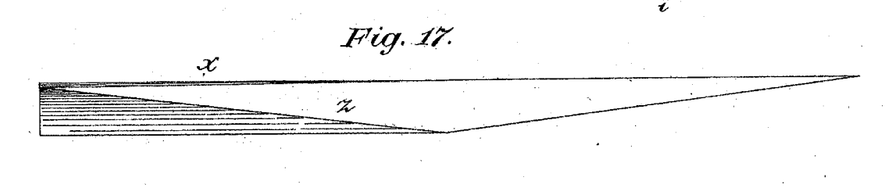
Fig. 17 is a side view of a strip to be operated upon by my improved machine, and Figs. 18 to 22, inclusive, are a series of cross-sections of said strip and illustrate the operation of the several cutters employed in the machine. Of these diagrams
Figure 18:
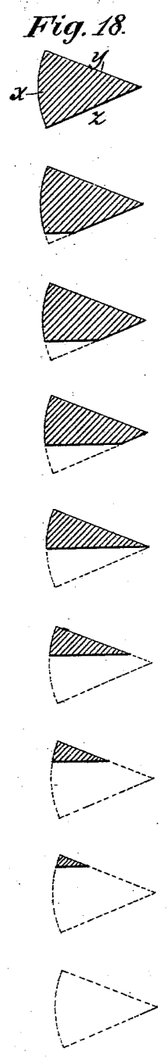
Fig. 18 represents a series of sections of a strip in its original form and corresponding to the sections shown in Fig. 16, but on an enlarged scale. The sections comprising Fig. 19 illustrate the action of the truncating knives or cutters consecutively upon each of the sections shown in Fig. 18.

The strips of ratan which are to be acted upon and trimmed in my improved machine are substantially as shown in Fig. 17, which represents a side view of one of such strips. In order more clearly to understand the nature of the strip, attention is invited to Figs. 15 and 16, the former of which shows a top view of a segmental strip of ratan preparatory to its being divided into a pair of complementary sections. This strip may of course be of any desired length, and its cross-section is like that of a sector and substantially uniform throughout its length. The strip has three sides, (designated herein by $x$, $y$, and $z$,) the side $x$ being a portion of the outer side of a cylindrical body of ratan, while the sides $y$ and $z$ are portions of the body and intersecting in a line corresponding to the axis of the cylinder, so that while the outer surface $x$ will be in the original condition of the outer skin of the ratan the sides $y$ and $z$ will be of fibrous nature and therefore easily cut. The strip, as shown in Fig. 15, is at first subjected to the action of the cutter or knife, whereby a cut obliquely of the strip and in a direction with the axial line of the strip will be produced, this cut dividing the formerly single segmental strip into two parts, both of which will be precisely alike and the cross-sections of which at different points longitudinally thereof will be substantially as shown in Fig. 16. The shape of the several cross-sections of one of these strips is reproduced on an enlarged scale in Fig. 18, and it is in this condition that the strip is introduced into the feeding means, which in the present instance comprises a pair of feed-rollers 1 and 2, secured to spindles 3 and 4, respectively, which are journaled in swinging yokes 5 and 6, pivotally supported with their rear ends in upward extensions formed on the brackets $c$, while the forward ends of said yokes may be controlled or positioned in the following manner.

Pivotally secured to the sides of the yokes are a pair of links 7 and 8, a pair of adjacent ends of which are attached, as at 9, to a slide 10, which is mounted for horizontal movement in ways 11 and which may be actuated to open said rollers 1 and 2 by a suitable cam 12, engaging the cam-roller 13, journaled on the slide 10, while a spring, such as 130, may be employed for normally closing said feed-rollers 1 and 2 onto the strip when permitted to do so during the rotation of the cam 12.

Rotary movement may be imparted to the feed-rolls 1 and 2 by a pair of spiral gears 14 and 15, secured to the spindles 3 and 4, respectively, and the lower one of which is in engagement with another spiral gear 16, secured upon the shaft $d$.

Figure 19:
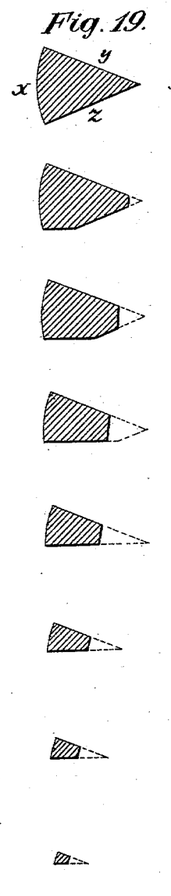

After the strip has been properly placed between the feed-rolls by the entering device or drum $f$ said rollers 1 and 2 will engage said strip on its sides $y$ and $z$, respectively, and bring the same into engagement with a series of preparatory cutters or knives, whereby said strips will be truncated, as shown in Fig. 19, the construction of such cutter-heads $b$ being more clearly illustrated in Figs. 5 to 8, inclusive, in which 20 denotes a knife-blade clamped within a holder 21—as, for instance, by screws 22—said holder being pivoted upon trunnions 23, projecting from extensions 24 of a block 25, and said holder 21 may be held in normally straight position—as, for instance, by a spring 260, secured to the block 25 and in engagement with the straight front face of the holder 21. By this organization the holder may swing slightly to permit the knife-blade 20 to adapt itself to the inclination of the cut relative to the longitudinal axis of the strip.

Figure 9:
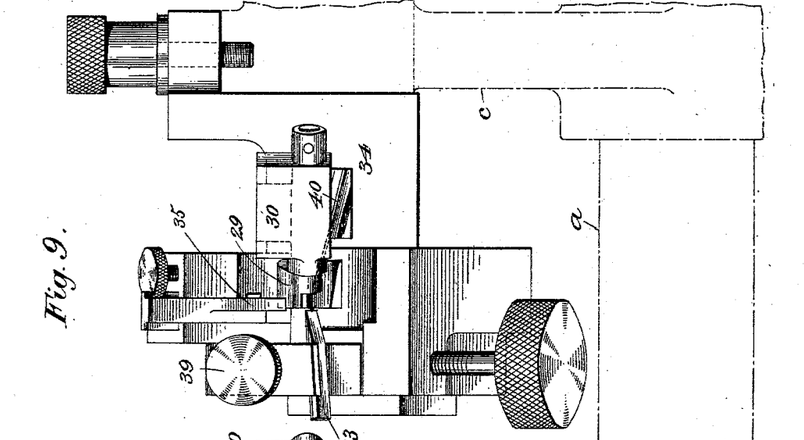
Figs. 9, 10, 10$^a$, and 10$^b$ illustrate front and side views, respectively, of what I preferably term a "roughing-cutter," whereby the greater part of the surplus stock of the truncated strip will be removed from one side thereof.
Figure 10:
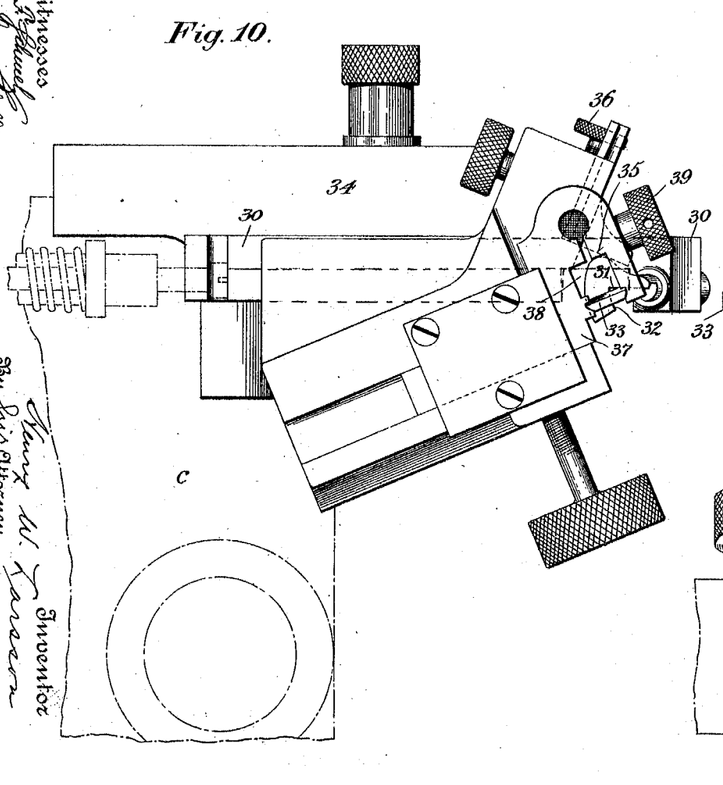
Figure 10A:
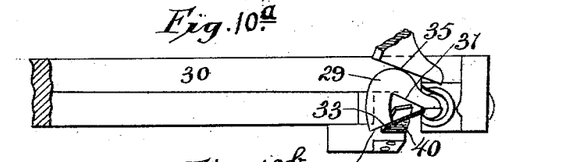
Figure 10B:
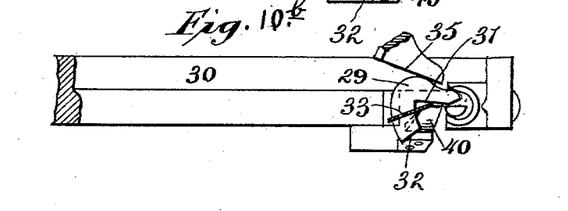

The preparatory cutter-head comprises in the present instance a pair of such knives arranged one behind the other, and while in the drawings a pair of such heads have been shown it should be understood, of course, that this number may be varied as desired. The block 25 is preferably secured to a slide 26, to which a reciprocatory movement may be imparted by a cam 27, in engagement with a suitable cam-roller 28, pivoted on the slide, such movement being effective to move the knife-edge laterally across the path of the strip during the longitudinal movement thereof and in this manner truncating the strip, as is clearly shown in Fig. 19. After passing the preparatory or truncating cutters the strip is carried into contact with the "roughing" cutter-head. (Shown at the left of Figs. 1$^a$ and 2$^a$ and also illustrated in detail in Figs. 9 and 10.) The strip is in this instance supported in a receiver 29, pivotally held within the forward end of a slide 30 and having a guiding-face 31 and an abutment-face 32, whereby the strip may be properly positioned and subjected to the action of a cutter or knife 33, which will remove the greater part of the surplus stock from the side $z$ and in the manner shown in Fig. 20. The slide 30 is mounted for reciprocation in a head 34, the forward end of which carries a cam 35, which is stationary and may be adjusted as required—as, for instance, by an adjusting-screw 36. (See Fig. 10.) Any suitable device may be employed for holding the knife 33, the device shown herein consisting of a knife-holder 37, adjustably retained within the head 34, said knife-holder being provided with an aperture 38 to permit the passage of the strip past the knife and having a clamp-screw 39 for removably holding the knife in proper position.

Figure 1A:
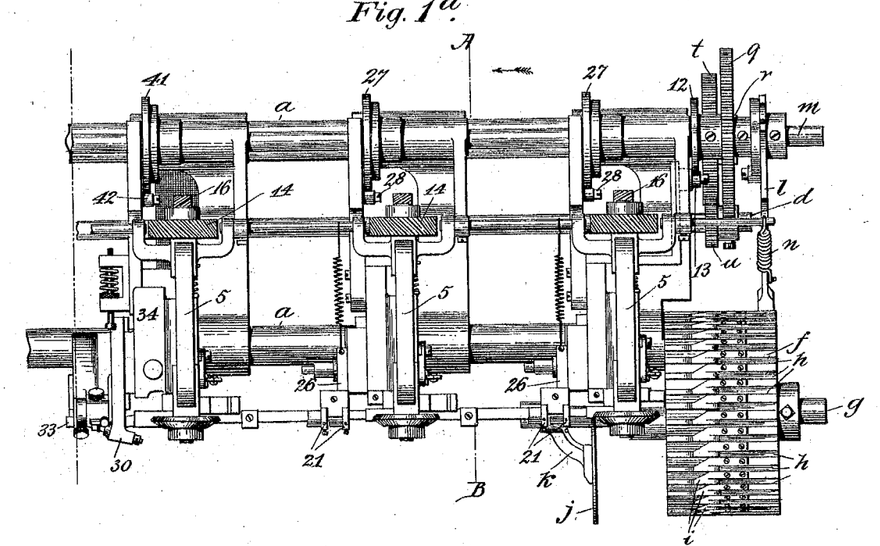

Means are provided for retaining the strip in contact with the guide-face 31 of the receiver, these means consisting, preferably, of a spring 40, secured to the slide 30, so that said spring may also perform the function of holding the receiver in contact with the cam-face 35. It will therefore be seen that as the slide 30 is reciprocated the receiver 29 will be oscillated, and thus forces the under side of the strip into contact with the cutter 33. Reciprocatory movement may be imparted to the slide 30 by a cam 41, in engagement with a roller 42, pivotally held on the slide, as shown in Fig. 1ª.

Figure 1B:
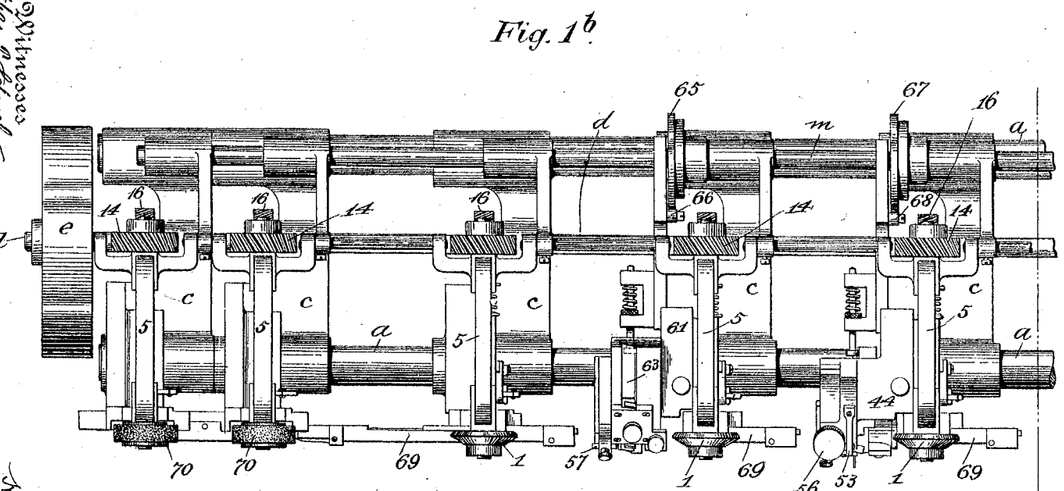
Figure 2A:
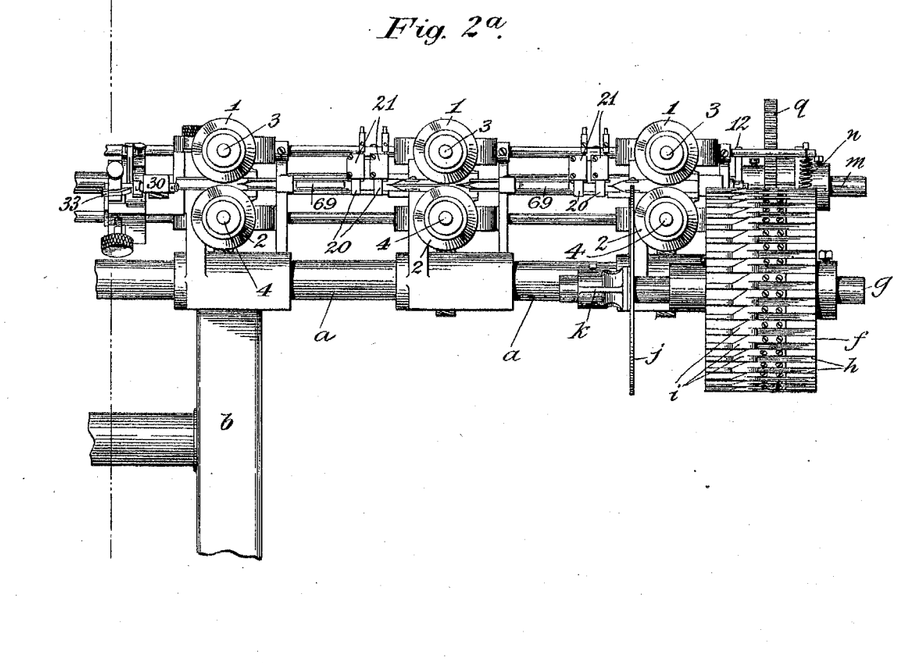
Figure 2B:
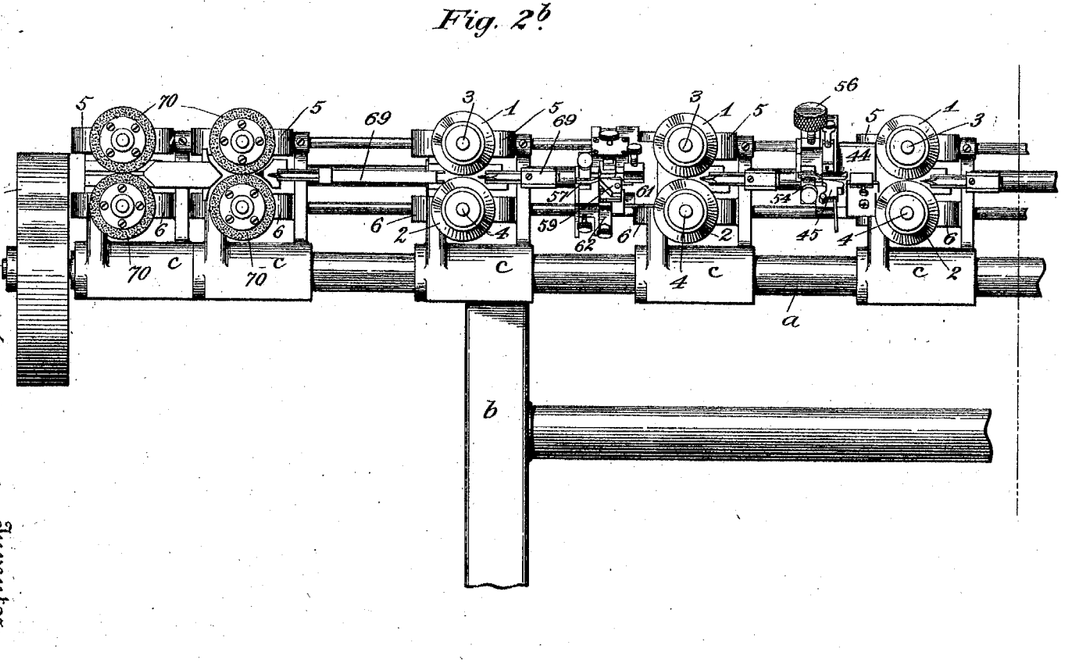
Figure 11:
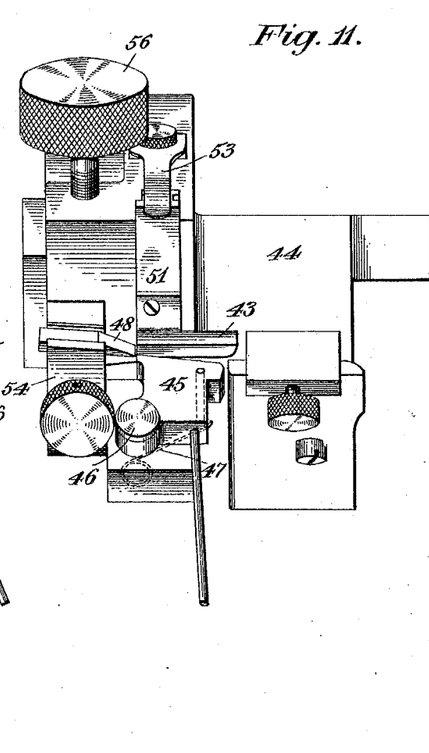
Figs. 11 and 12 are similar views of a trimming-cutter, whereby the other side of the strip will be straightened and trimmed to form the proper angle with the outer surface of the strip.
Figure 12:
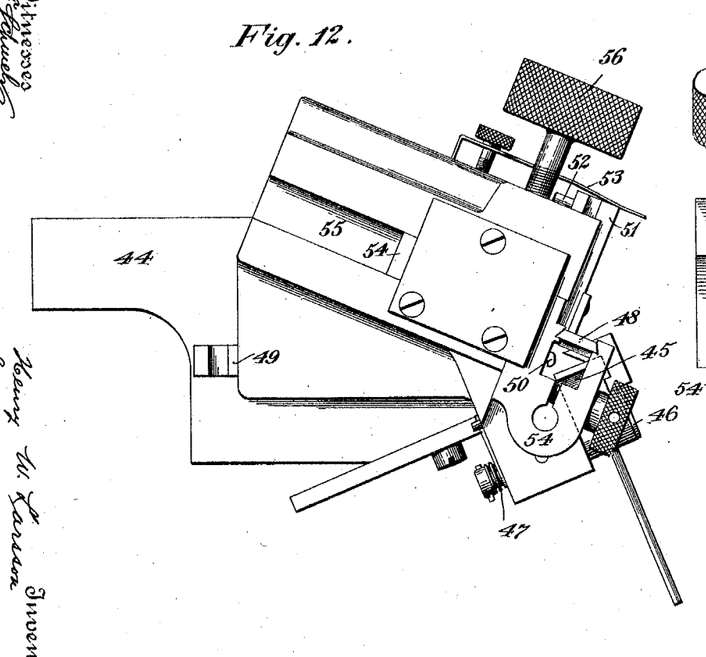
Figure 13:
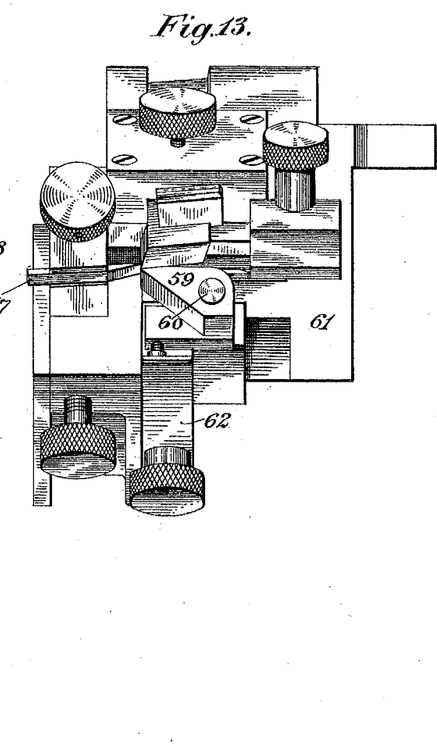
Figs. 13 and 14 are front and side views, respectively, of what I preferably call the "finishing-cutter," employed for trimming the remainder of the stock from the strip and on that side which had been previously operated upon by the roughing-cutter.
Figure 14:
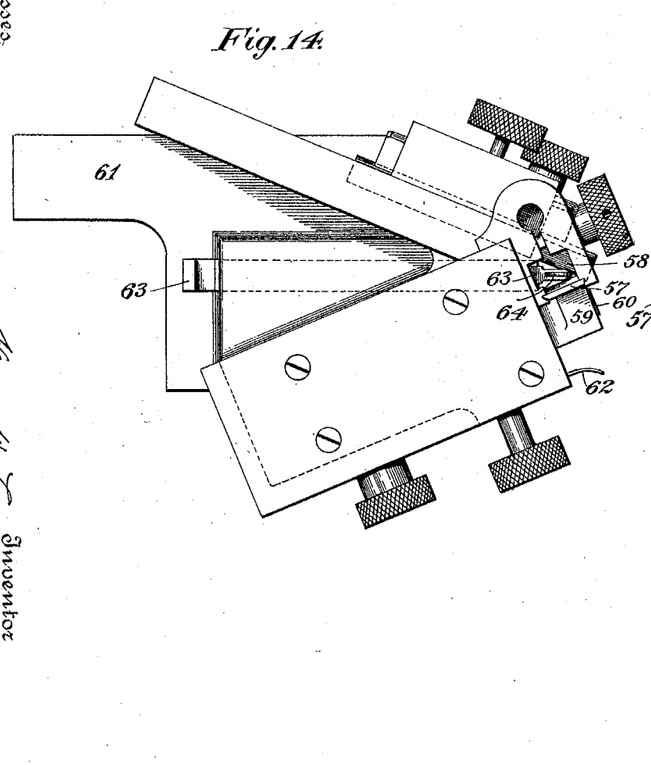
Figure 20:
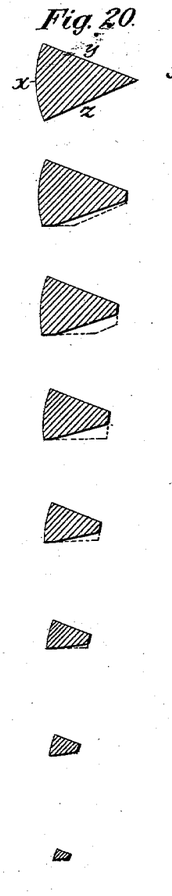
Fig. 20 illustrates the work produced by the roughing-cutter, which in the present instance is effective upon the lower side of the substantially triangular cross-sectional strip.
Figure 21:
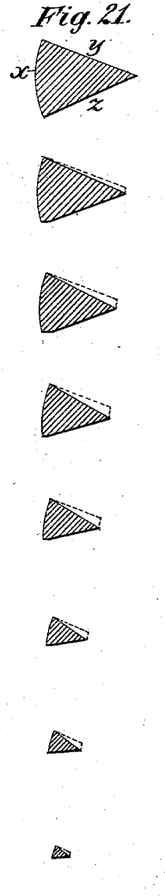
Fig. 21 shows the operation of the trimming-cutter, whereby the upper and other side of the strip is shaped or trimmed.

After the lower side $z$ has been trimmed to reduce the cross-section of the strip substantially from end to end thereof in the manner shown in Fig. 20 the strip is carried into contact with a trimming-cutter, which is illustrated at the right of Figs. 1$^b$ and 2$^b$ and which is shown in detail in Figs. 11 and 12 of the drawings. This trimming cutter-head comprises a guiding device consisting of a fixed jaw 43, secured to the head 44 and in coöperation with a movable jaw 45, which is pivoted at 46 and may be actuated by a spring, such as 47, against the fixed jaw 43, in this manner forming a trough or channel in which the strip to be trimmed may be properly guided into contact with a knife or other cutter 48, while a plunger-slide, such as 49, may engage with its head 50 the strip contained within the channel above referred to and keep the same in close contact with the faces of the jaws 43 and 45. While ordinarily the fixed jaw 43 is never disturbed, provision has been made to allow for accidents, and the fixed jaw 43 is therefore held upon a slide 51, the downward movement of which may be limited—as, for instance, by a pin 52 striking the upper surface of the head, while a spring 53 may be employed to retain the slide 51 in its downward position. The cutter 48 may be held in any suitable manner, the device shown in the present instance consisting, substantially, of a slide 54, adjustably held in ways 55 and retained in proper position by a set-screw 56. By referring to Fig. 12 it will be seen that the cutter 48 is placed above the center line of the strip, so that the upper side of the strip may be properly trimmed to correspond with the sections illustrated in the diagrams, Fig. 21. After passing the trimming-cutter the strip is now passed on to what I preferably term the "finishing cutter-head," shown in detail in Figs. 13 and 14, in which 57 denotes a suitable knife held in a manner similar to that of the knife 48, the strip being held in this instance in proper position by an abutment or guiding-face 58, against which the strip will rest with its finished side $y$, while the lower side $z$ will come into contact with a member 59, pivoted at 60 to the cutter-head 61 and actuated by a spring 62 for forcing the strip into engagement with the guiding-face, and thus present said strip properly to the action of the knife 57.

In order to insure the proper disposition of the strip relatively to the guide 58 and to a seat against the member 59, means are provided whereby the strip may be forced into proper place, this means consisting substantially of a slide 63, provided at its forward end with an antifriction-roller 64, the latter being especially intended to reduce the liability of breaking or tearing off the fine tapered end of the strip as it is held in place in the manner above described. Reciprocatory movement may be imparted to the slide 63—as, for instance, by a cam 65 acting against the cam-roller 66 substantially in a manner similar to that of the cam 67 acting against the cam-roller 68, which may be pivotally supported on the slide 49, above referred to.

Figure 22:
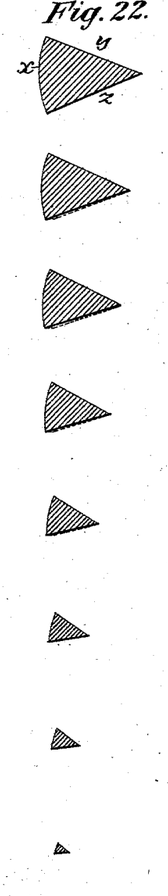
Fig. 22 shows the effect of the finishing-cutter in its work upon the lower side previously cut by the roughing-cutter and now showing the strip of ratan reduced into its proper form.

Suitable means are provided for guiding the strip from one cutter to the next succeeding one, such means consisting, preferably, of troughs or conduits 69 interposed between the several cutter-heads and also leading a strip toward a set of rollers 70, the outer surface of which is made of yielding material, so as not to injure the strip after it has been trimmed to its proper shape and size and whereby said strip may be withdrawn and discharged from the machine after passing all of the cutters for its entire length, when the several sections of the strip will be shaped corresponding to the diagrams shown in Fig. 22.

In the foregoing description of the machine I have included also the operation thereof upon the strip during its passage through the machine, and it need only be noted that as soon as a strip has been sufficiently withdrawn another strip may be entered between the first set of feed-rollers by the drum $f$, which is properly actuated to that end by the dog $l$, above mentioned, and as will be readily understood.

Many changes may be made in the organization and particular construction of the several elements constituting my improved machine and without departing from the spirit of my invention, and I wish it therefore to be distinctly understood that I do not limit my invention to the precise formation of the several parts hereinbefore described, and shown in the drawings.

Having described my invention, what I claim as new, and desire to secure by Letters Patent, is—

1. In an organized machine, the combination of guiding means arranged to inclose a substantially sectoral bore, a cutter arranged with its cutting edge substantially transverse to a line bisecting the angle of said bore, and cutters arranged in advance of said cutter with their cutting edges substantially parallel with the sides forming the angle of said bore.

2. In a machine of the class described, the combination of a guide having a substantially V-shaped cross-section, a cutter arranged with its cutting edge substantially transverse to a line bisecting the angle of the V-shaped guide, a second cutter arranged in advance of said cutter with its cutting edge substantially parallel with the plane of one of the strip-engaging sides of the guide, a third cutter disposed in advance of the latter cutter with its cutting edge substantially parallel with the plane of the other strip-engaging side of the guide, and a fourth cutter arranged in advance of the latter cutter with its cutting edge substantially parallel with the cutting edge of the said second cutter.

3. The combination with strip-guiding means; and means for reducing the strip; of a strip-entering device comprising an intermittently-rotatable carrier arranged with the plane of its rotation transverse to the strip-guiding path, so as to thereby bring the strips successively into said path; and a plate arranged to govern the position of the strips on the carrier.

4. The combination with strip-guiding means, and means for reducing the strip, of a strip-entering device comprising a rotatable drum having a series of longitudinally-arranged strip-holders at its periphery, said drum being arranged to bring said holders successively into alinement with the strip-guiding means.

5. The combination with strip-guiding means, and means for reducing the strip, of a strip-entering device comprising a rotatable drum having a series of longitudinally-arranged strip-holders on its periphery, said drum being arranged to bring said holders successively into alinement with the strip-guiding means, and means for intermittently rotating the drum.

6. The combination with strip-guiding means, and means for reducing the strip, of a strip-entering device comprising a rotatable drum having a series of longitudinally-arranged strip-holders on its periphery, said drum being arranged to bring said holders successively into alinement with the strip-guiding means, and a gage-plate for positioning the strips on the drum.

7. The combination with strip-guiding means, and means for reducing the strip, of a strip-entering device, comprising a drum having a series of longitudinal notches in its periphery, and a spring extending over each notch, said drum being arranged to be rotated and thereby bring the notches in succession into alinement with the strip-guiding means.

8. The combination of a pair of coacting feed-rolls, a pair of pivoted arms each having one of said rolls rotatable thereon, a pair of levers pivoted together at their extremities, and having their other extremities pivoted to said arms respectively; a slide connected to the pivotal jointure of said levers, a driving-shaft, and means for reciprocating the slide from said driving-shaft.

9. The combination of a pair of coacting feed-rolls, a pair of pivoted arms each having one of said rolls rotatable thereon, a pair of levers pivoted together at their extremities, and having their other extremities pivoted to said arms respectively, a slide connected to the pivotal joint of said levers, a driving-shaft, means for reciprocating the slide from said driving-shaft, a spiral gear on the shaft of each roll and arranged to intermesh, and a spiral gear on the driving-shaft arranged to engage one of said gears.

10. In an organized machine, the combination with means for guiding and feeding a strip, of a slide movable transversely to the path of a strip and a pair of cutters pivotally mounted on said slide and arranged to act on the strip consecutively.

11. In an organized machine, the combination with means for guiding and feeding a strip, of a slide movable transversely to the path of the strip, a pair of cutters pivotally mounted on said slide and arranged to act on the strip consecutively, and means connected with the feeding means for reciprocating the slide.

12. In a machine of the class described, the combination of a guide having a substantially V-shaped cross-section, a cutter movable transversely to the guide and arranged with its cutting edge substantially transverse to a line bisecting the angle of the V-shaped guide, strip-feeding means, and means coöperative therewith for moving the cutter.

13. In a machine of the class described, the combination of a support, a knife fixed on said support, a slide mounted on said support, a receiver or guide for a strip pivoted on said slide, and disposed in proximity to said knife, and a cam on said support arranged to engage the receiver on the movement of the slide and thereby oscillate the receiver.

14. In a machine of the class described, the combination of a support, a knife fixed on said support, a slide mounted on said support, a receiver or guide for a strip pivoted on said slide, and disposed in proximity to said knife, and a cam on said support arranged to engage the receiver on the movement of the slide and thereby oscillate the receiver, strip-feeding means, and means coöperative therewith for operating said slide.

15. In a machine of the class described, the combination of a support having a guide mounted thereon for guiding a substantially V-shaped strip, said guide comprising a fixed jaw and a movable jaw having its strip-engaging face at an angle with said fixed jaw; a knife secured to the support in proximity to said jaws; and a slide mounted on said support and having a head in proximity to said guide, said slide being arranged to engage the strip and vary its position in said guide with respect to said knife.

16. In a machine of the class described, the combination of a support having a guide mounted thereon for guiding a substantially V-shaped strip, said guide comprising a fixed jaw and a movable jaw having its strip-engaging face at an angle with said fixed jaw; a knife secured to the support in proximity to said jaws, a slide mounted on said support and having a head in proximity to said guide, said slide being arranged to engage the strip and vary its position in said guide with respect to said knife, strip-feeding means, and means coöperative therewith for operating said slide.

17. In a machine of the class described, the combination of a support having a guide mounted thereon for guiding a substantially V-shaped strip, said guide comprising a fixed jaw and a pivoted jaw having its strip-engaging face at an angle with said fixed jaw; a knife secured to the support in proximity to said jaws; and a slide mounted on said support and having an antifriction-roller at one end, said slide being arranged to engage the strip in said guide and vary its position therein with respect to said knife.

18. In a machine of the class described, the combination of a support having a guide mounted thereon for guiding a substantially V-shaped strip, said guide comprising a fixed jaw and a pivoted jaw having its strip-engaging face at an angle with said fixed jaw; a knife secured to the support in proximity to said jaws, a slide mounted on said support and having an antifriction-roller at one end, said slide being arranged to engage the strip in said guide and vary its position therein with respect to said knife-strip-feeding means, and means coöperative therewith for operating said slide.

Signed by me at Springfield, Massachusetts, this 8th day of June, 1901.

HENRY W. LARSSON.

Witnesses:
WM. S. BELLOWS,
M. A. CAMPBELL.